United States Patent
Risov et al.

(10) Patent No.: US 8,543,331 B2
(45) Date of Patent: Sep. 24, 2013

(54) APPARATUS, AND ASSOCIATED METHOD, FOR PLANNING AND DISPLAYING A ROUTE PATH

(75) Inventors: Marie Risov, Bloomfield, MI (US); Kas Kasravi, West Bloomfield, MI (US); Corey W. Wick, Dallas, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1478 days.

(21) Appl. No.: 12/167,963

(22) Filed: Jul. 3, 2008

(65) Prior Publication Data
US 2010/0004858 A1 Jan. 7, 2010

(51) Int. Cl.
*G01C 21/00* (2006.01)

(52) U.S. Cl.
USPC ........... 701/425; 701/400; 701/411; 701/416; 701/420; 701/421; 340/988; 340/905; 340/990; 340/991; 340/993; 342/357.31; 342/357.75; 342/450; 342/457; 455/456.5

(58) Field of Classification Search
USPC ............. 701/25, 35, 207, 208, 209, 200, 201, 701/202, 211, 212, 213, 217, 225, 400, 411, 701/416, 420, 421, 438, 440, 446, 450, 451, 701/453, 454; 340/988, 905, 990, 991, 993, 340/995.1, 995.12, 995.17, 995.18, 995.19, 340/995.22, 995.23, 995.24; 342/357.31, 342/357.75, 450, 457; 455/456.5; 73/178 R
See application file for complete search history.

(56) References Cited

U.S. PATENT DOCUMENTS

| | | | | |
|---|---|---|---|---|
| 5,794,151 | A * | 8/1998 | McDonald et al. | 455/454 |
| 6,061,629 | A | 5/2000 | Yano et al. | |
| 6,128,571 | A * | 10/2000 | Ito et al. | 701/201 |
| 6,321,158 | B1 * | 11/2001 | DeLorme et al. | 701/201 |
| 6,362,751 | B1 | 3/2002 | Upparapalli | |
| 6,813,558 | B1 * | 11/2004 | Lapstun et al. | 701/533 |
| 7,231,293 | B2 * | 6/2007 | Lapstun et al. | 701/533 |
| 7,251,560 | B2 * | 7/2007 | Ogasawara et al. | 701/423 |
| 7,475,057 | B1 * | 1/2009 | Obradovich | 701/532 |
| 7,801,674 | B2 * | 9/2010 | Asai | 701/522 |
| 8,165,805 | B2 * | 4/2012 | Steins et al. | 701/435 |
| 2003/0069693 | A1 * | 4/2003 | Snapp et al. | 701/213 |

(Continued)

FOREIGN PATENT DOCUMENTS
JP 11304516 A * 11/1999

OTHER PUBLICATIONS

Notification of Transmittal of the International Search Report and the Written Opinion of the International Searching Authority or the Declaration, dated Jan. 7, 2010 from counterpart PCT application Serial No. PCT/US2009/049555 filed Jul. 2, 2009 (4 pages).

(Continued)

*Primary Examiner* — McDieunel Marc

(57) ABSTRACT

An electronic map device apparatus, and an associated method, creates a route between a route source and a route destination for display at the electronic map device. Locations, area, and features that a user does not desire to encounter during travel along the route are identified and form exclusion information. The exclusion information is entered by way of a user interface. The exclusion information is utilized in the formation of the selected route. A mapping that identifies the selected route is displayed at a display device of the user interface.

18 Claims, 4 Drawing Sheets

(56) References Cited

U.S. PATENT DOCUMENTS

| | | |
|---|---|---|
| 2003/0158655 A1 | 8/2003 | Obradovich et al. |
| 2007/0286349 A1* | 12/2007 | Dennis et al. .................. 379/21 |
| 2008/0059015 A1* | 3/2008 | Whittaker et al. ............. 701/23 |
| 2008/0147313 A1 | 6/2008 | Nesbitt |
| 2008/0147318 A1 | 6/2008 | Steins et al. |

OTHER PUBLICATIONS

Written Opinion of the International Searching Authority, dated Jan. 7, 2010 from counterpart PCT application Serial No. PCT/US2009/049555 filed Jul. 2, 2009 (4 pages).

International Search Repor, , dated Jan. 7, 2010 from counterpart PCT application Serial No. PCT/US2009/049555 filed Jul. 2, 2009 (3 pages).

* cited by examiner

APPARATUS, AND ASSOCIATED METHOD, FOR PLANNING AND DISPLAYING A ROUTE PATH

The present invention relates generally to a manner by which to create and display a route path mapped between two locations. More particularly, the present invention relates to an apparatus, and an associated method, in which geographical areas or locations that are identified to be undesirable are excluded from potential route paths during route creation. A resultant, mapped route path is more likely to be acceptable to a user as the mapped route does not include a geographical area or location identified to be undesirable.

BACKGROUND OF THE INVENTION

Conventional travel planning regularly involves making access to road, or other, maps. Access to such maps provides a planner with information to facilitate determination, or selection, of a route path to be taken during the travel.

Maps have long been printed, or otherwise disposed upon paper or analogous materials. Relatively recently, as a result of advancements in processing technologies, mapping functionality is provided by electronic devices. Map functionality is able to be of increased portability as well as, sometimes, increased capabilities of personalization.

Electronic map devices typically include portable display devices that permit the display of maps of any of various geographical areas. In some of such devices, a map is created and displayed upon the display device by retrieving map indicia from a storage element. The map indicia, once retrieved, are used in the creation of a map display that is displayed at the display device. When the storage element is of large storage capacity, and large amounts of map indicia are stored thereat, map-generative capabilities permit map creation and display of any area of sometimes even worldwide scope.

Internet-based mapping applications are also available. For instance, Yahoo™ and Google™ map applications are used by many to map a location or to obtain a map showing a route between a set of locations. As internet accessibility is also carried out through radio connections, the Yahoo, Google, and other internet-based mapping applications are available in mobile scenarios. For instance, a mapping application is available to an operator, or passenger, of a moving, motor vehicle. The operator or passenger, for instance, is able to request, and obtain display of, a map that identifies a route to be taken to reach a desired destination, obviating the need of a conventional, paper map.

Electronic map devices are sometimes embodied together with GPS (global positioning system) receivers, or otherwise are provided with positional information. The positional information permits maps to be generated and displayed that identify the present position of the motorized vehicle, or an area offset therefrom. As the position of the vehicle changes, the map display is updated, using updated GPS information.

The internet mapping applications, as well as others, sometimes also provide feature information associated with geographical locations. For instance, the features include identification of business establishments, such as restaurants, hotels, recreational enterprises, etc. And, features sometimes also include identification of scenic locations, historical markers, etc. Display of the features together with, or otherwise in association with, a mapped route provides a viewer with additional information associated with locations along a mapped route.

While electronic map devices provide a user with many viewing advantages, conventional map applications have well-developed capabilities to create map routes between a set of locations, i.e., a route source and a route destination, conventional map applications are generally unable to create a map route that excludes a location or area. That is to say, a user might well have a preference in routes that are formable between the route source and destination. The preference, e.g., is a preference for the route not to include a location, feature, or area. In order for a user to cause creation of a route path that does not include an undesired location or area, the user typically must cause the generation of multiple sub-routes, each sub-route having a route source and destination. The user must either have some knowledge of the geographical error or must, through trial and error, make multiple sub-routes, map requests. While interactive screens are also provided that facilitate the route selection, such as a drag-and-drop user interface provided by Google™, the route selection scheme still requires that the user define multiple sub-routes in order to avoid the undesired location or area. The drag-and-drop user interface is merely a more user-friendly manner by which to cause creation of the route in which the sub-routes are selected by the user to not include the undesired location or area.

If a manner could be provided by which more automatically to cause creation of a map route that excludes an undesired location or area, improved user experience would be provided.

It is in light of this background information related to map or route creation that the significant improvements of the present invention have evolved.

SUMMARY OF THE INVENTION

The present invention, accordingly, advantageously provides an apparatus, and an associated method, by which to plan and display a route path mapped between a set of locations.

Through operation of an embodiment of the present invention, a manner is provided by which to plan the route in which geographical areas or locations that are identified to be undesirable are excluded from potential route paths.

In one aspect of the present invention, the resultant, mapped route is more likely to be acceptable to a user as the mapped route does not, or is less likely to, include an undesired location or area.

In another aspect of the present invention, identification is made of a location exclusion point, a location or area that a user desires not to be included in a route extending between source and destination locations. The location exclusion point comprises, e.g., a geographical location, representable in terms of latitudinal and longitudinal, or other, coordinates, or the location exclusion point comprises an area, defined by boundary parameters, e.g., a defined radial distance from a location, an area defined by sets of longitudinal and latitudinal parameters, etc. The location exclusion point is further definable as a road-type, a feature-type, or a geographical-type exclusion identified by a type of road that is not to be included in the created route, a feature-type, or a geography-type that is to be excluded from the created route.

In another aspect of the present invention, a user interface is provided and is of a type permitting user input of the location exclusion. The user interface comprises, for instance, an input actuator permitting of alphanumeric, or other, inputs that define the location exclusion. Alternately, or additionally, the user interface comprises an interactive display screen that includes touch screen capabilities and by way of which user inputs are provided. The location exclusion point is further definable as exclusion of locations at which an enterprise is located, e.g., a fast-food restaurant or other enterprise. That is to say, the location exclusion point is associated with an excluded entity. An associator is used to associate the excluded entity with an associated exclusion location.

In another aspect of the present invention, a storage element is provided that stores user-entered exclusion information, such as user-entered exclusion locations, entities, etc. Once entered and stored, the storage-element stored information is accessible pursuant to subsequent operation, obviating the need of the user again to input exclusion information.

In another aspect of the present invention, a pattern identifier is provided with information stored at the storage element. The pattern identifier operates to identify patterns associated with the input and stored information. If, for instance, the user has, in prior map requests, made certain types of, or specific, exclusion entries, the pattern identifier identifies a pattern associated with such entries and identifies exclusions based upon the identified pattern.

In another aspect of the present invention, positional information, such as positional information provided by way of a GPS (global position system) receiver is also provided automatically. The positional information is used pursuant to the input of the exclusion information. The positional information is used, e.g., to associate a location or area with an entered exclusion indication. For instance, in a mobile application, a user is able to enter, in real-time, exclusion information. By associating positional information, such as positional information provided by a GPS receiver, a position is automatically associated with the entered exclusion information without requiring the user to enter the associated positional information.

In another aspect of the present invention, a route mapper is provided that maps a route between a route source and a route destination. The route mapper creates a map that includes the created route and provides for the display of the map and the created route. The route is created taking into account a location exclusion point identified by location exclusion information. The route is created, for instance by categorizing the excluded location or area as an unavailable or unpassable route path. Thereby, the resultant route is a route that does not include an undesired location or area.

In these and other aspects, therefore, an apparatus, and an associated method is provided for facilitating route planning between a route source and a route destination. A location point exclusion identifier is configured to identify at least a first location exclusion point. A route mapper is configured to map a route between the route source and the route destination. The route at least selectably excludes the location exclusion point from the route.

A more complete appreciation of the scope of the present invention and the manner in which it achieves the above-noted and other improvements can be obtained by reference to the following detailed description of presently-preferred embodiments taken in connection with the accompanying drawings, which are briefly summarized below, and by reference to the appended claims.

DETAILED DESCRIPTION

Figure 1:
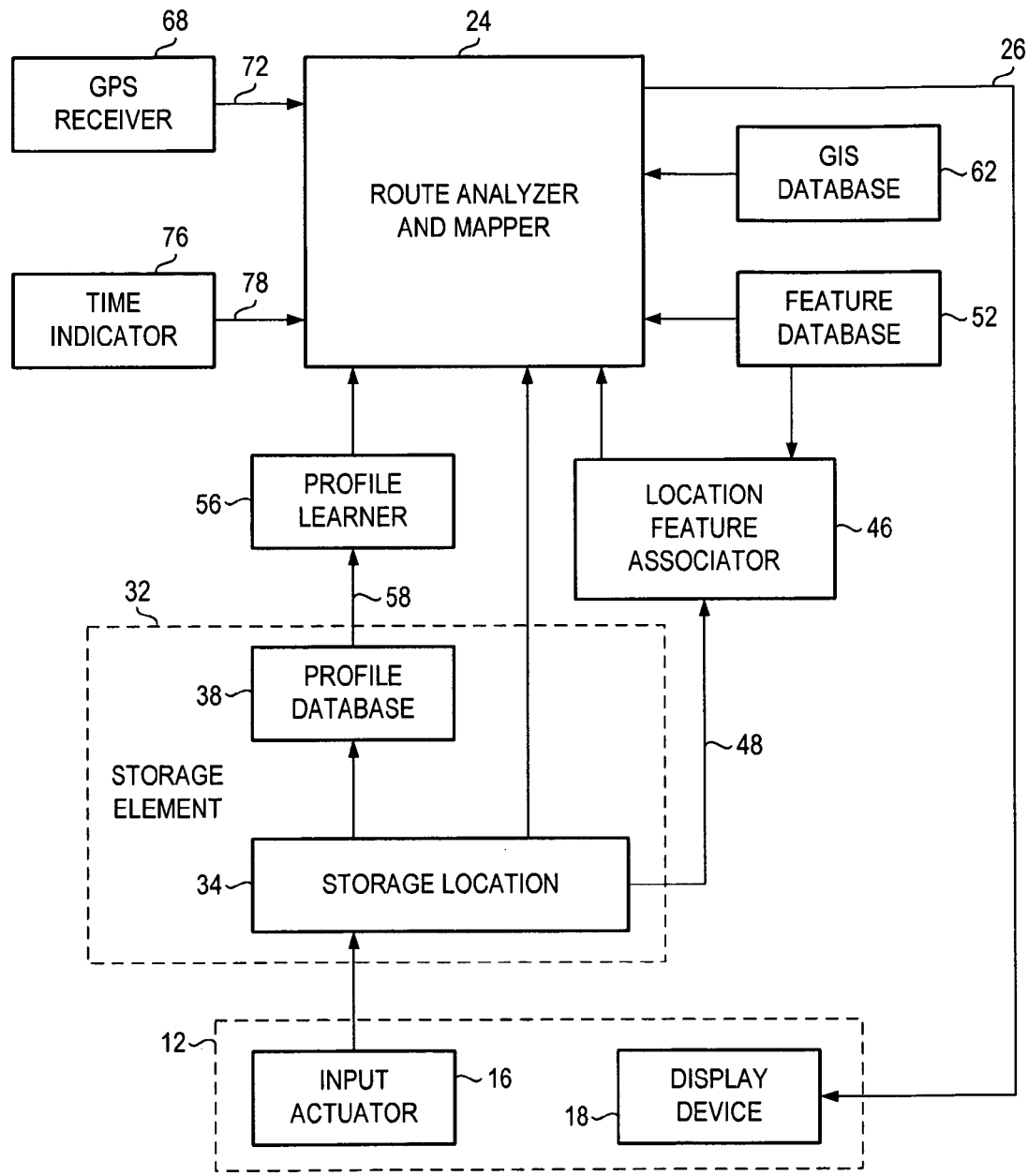
FIG. 1 illustrates a functional block diagram of an arrangement that includes an embodiment of the present invention as a portion thereof.

Referring first, to FIG. 1, an electronic mapping device 10 provides for the creation and display of map displays containing map routes that identify paths extending between a route source and a route destination. The map routes that are displayed are created in manners that take into account locations and areas considered by a user to be undesirable.

The elements of the electronic map device 10 form an apparatus that is implementable in any desired manner, including, for instance, by algorithms executable by processing circuitry. In the exemplary implementation, the elements of the map device are of relatively small configuration, permitting their housing at a portable housing to permit the electronic map to be carried by a user or to be positioned in a motorized vehicle. While the following description shall describe exemplary operation with respect to the exemplary implementation in which the electronic map device comprises a portable device, in other implementations, operation is analogous.

The device 10 includes a user interface 12 here shown to include an input actuator 16 and a display device 18. When the device is housed at a device housing (not separately shown), the input actuator and the display are mounted at the housing so that the display is readily viewable by a user, and the input actuator is readily accessible by the user. In one implementation, the input actuator comprises a touchpad comprising, for instance, an alphanumeric keypad. In another implementation, the input actuator and display device comprise an interactive touch screen display in which inputs are entered by way of a touch screen device. The display, in the exemplary implementation, comprises a color display of appropriate precision permitting visual display of a map and a route identified thereon viewing by a user.

A route analyzer and mapper 24 operate to generate a map display for display at the display device 18. The line 26 is representative of the connection between the mapper 24 and the display device 18 by which the map information formed by the mapper is provided to the display device for display thereon. As shall be described below, the operation of the route analyzer and mapper is dependent upon input information, such as that provided by way of the input actuator, entered by a user of the device.

As mentioned previously, conventional map devices are generally unable to provide a map route in which undesired locations or areas are excluded from a created route. Overcoming this deficiency of conventional such devices, the apparatus of the electronic map device provides for map route creation in which the created route is at least selectably free of locations and areas identified to be undesired. The user need not request mappings of multiple sub-routes and manually elect to reject certain sub-routes if the sub-routes pass through locations or areas that are considered to be undesired.

The device 10 further includes a storage element 32 that includes storage locations 34 and storage locations 38 that define a profile database. Inputs generated through actuation of the input actuator are provided to the storage element 32 and stored at a storage location thereof Input information is also stored at the profile database 38. Information input by way of the input actuator includes exclusion information, that is to say, information identifying a location, feature, or area that the user desired to be excluded from a route generated by the route analyzer and mapper.

The exclusion information can be of any of various types and indications. For instance, the input information identifies a location, such as by its longitudinal and latitudinal coordinates or its name, that is indexable together with such coordinates. Or, e.g., the input information identifies area information that defines, e.g., by sets of longitudinal and latitudinal coordinates or information from which such coordinates are derivable, excluded road-type information, or excluded feature selections, i.e., features that the user desires not to encounter along the route.

Here, the device 10 further includes a location/feature associator 46 that operates to associate entered, feature exclusion information with locations of the associated features. The associator is here provided with the feature exclusion information by way of the line 48.

The device 10 further includes a feature database 52 that the associator 46 accesses in order to associate entered, exclusion information with feature locations. Associations made by the associator are provided to the route analyzer and mapper 24. The feature database 52 is also separately accessible during operation of the route analyzer and mapper 24.

The device 10 further includes a profile learner 56 that accesses, here by way of the line 58, contents of the profile database 38. The profile learner operates to identify a user profile based upon exclusion information entered into the profile database. The profile, once identified, is used pursuant to route creation by the route analyzer and mapper 24. The identified profile is used, for instance, to cause the route created by the route analyzer and mapper to exclude from eligibility any route that includes the excluded feature, location, or area based upon the identified profile.

The device further includes a GIS (Geographical Information System) database 62. The GIS database contains geographical information used by the route analyzer and the mapper in the map creation. The GIS information here includes both conventional, mapping information that is used to form a map as well as routes thereon and, additionally, road-construction information, demographic information of populations within geographical areas, geographical indicia, as well as any of various other types of GIS information. The exclusion information, in one implementation, includes any of the types of GIS information.

The route analyzer and mapper uses the information provided thereto, both the exclusion information, profile information, if any, and other input information to create a route extending between a route source and a route destination. The route analyzer and mapper further creates a map that forms a template upon which the created route is overlaid, or otherwise presented thereon. The created route and associated map is provided to the display device 18 for display thereon. In one implementation, additional GIS information, such as features located along the created route are further identified and further included in the display that is provided to the display device for display thereat and viewing by a viewer.

In the exemplary implementation, the device 10 further includes a GPS receiver 68 that provides positioning information, here by way of the line 72, to the route analyzer and mapper. Position information is used pursuant to the map creation. In one implementation, the device 10 is operated in a mobile scenario, such as in an automotive vehicle. The position information is used by the route analyzer and mapper to update the map, and the created route thereon, that is provided to the display device 18. By updating the map so that the display is current, i.e., based upon the current position of the electronic map device, a current map display is always available for viewing by the user.

In the exemplary implementation, the electronic map device 10 further includes a time indicator 76. The time indicator provides time indication information, here represented by way of the line 78, to the route analyzer and mapper. Time indication information is used, in one implementation, in which the exclusion information is time-based. For instance, a user might elect to exclude certain routes during high-traffic periods, e.g., during rush hours, or during inclement weather, e.g., avoiding hilly routes on snowy days. Route creation by the route analyzer and mapper is thereby able to take into account time-of-day exclusions in the route creation.

A route is automatically created to show a path between a route source and a route destination. The route takes into account exclusion information, i.e., locations, areas, or features identified to be undesired by the user. In the event that a route cannot be created that excludes all of the excluded locations, areas, or features identified to be undesirable, then a route is created that is least-worst, that is to say, a route is selected that includes the fewest number or incidences of excluded locations, features, or areas. The route is created automatically and, because the route takes into account the user preferences, a route that conforms to the requirements of the user is much more likely to be created. Improved user experience and acceptance is thereby provided.

Figure 2:
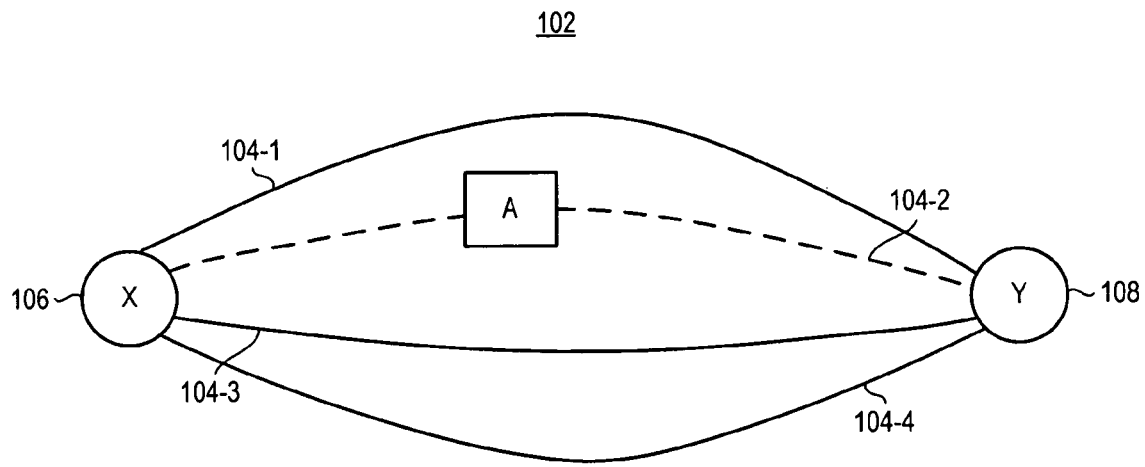
FIG. 2 illustrates a representation of exemplary potential routes extending between a route source and a route destination.

FIG. 2 illustrates a representation, shown generally at 102, representative of exemplary routes 104 extending between a route source 106 and a route destination 108. Here, the route 104-2 extends through a user-identified exclusion 112. The route 104-2 is excluded from consideration as a possible route. And, selection is made from the remaining routes 104, i.e., 104-1, 104-3, and 104-4, to form the selected or created route. Because the selected route does not include locations, areas, or features designated as undesirable, the user is more likely to accept the selected route.

Figure 3:
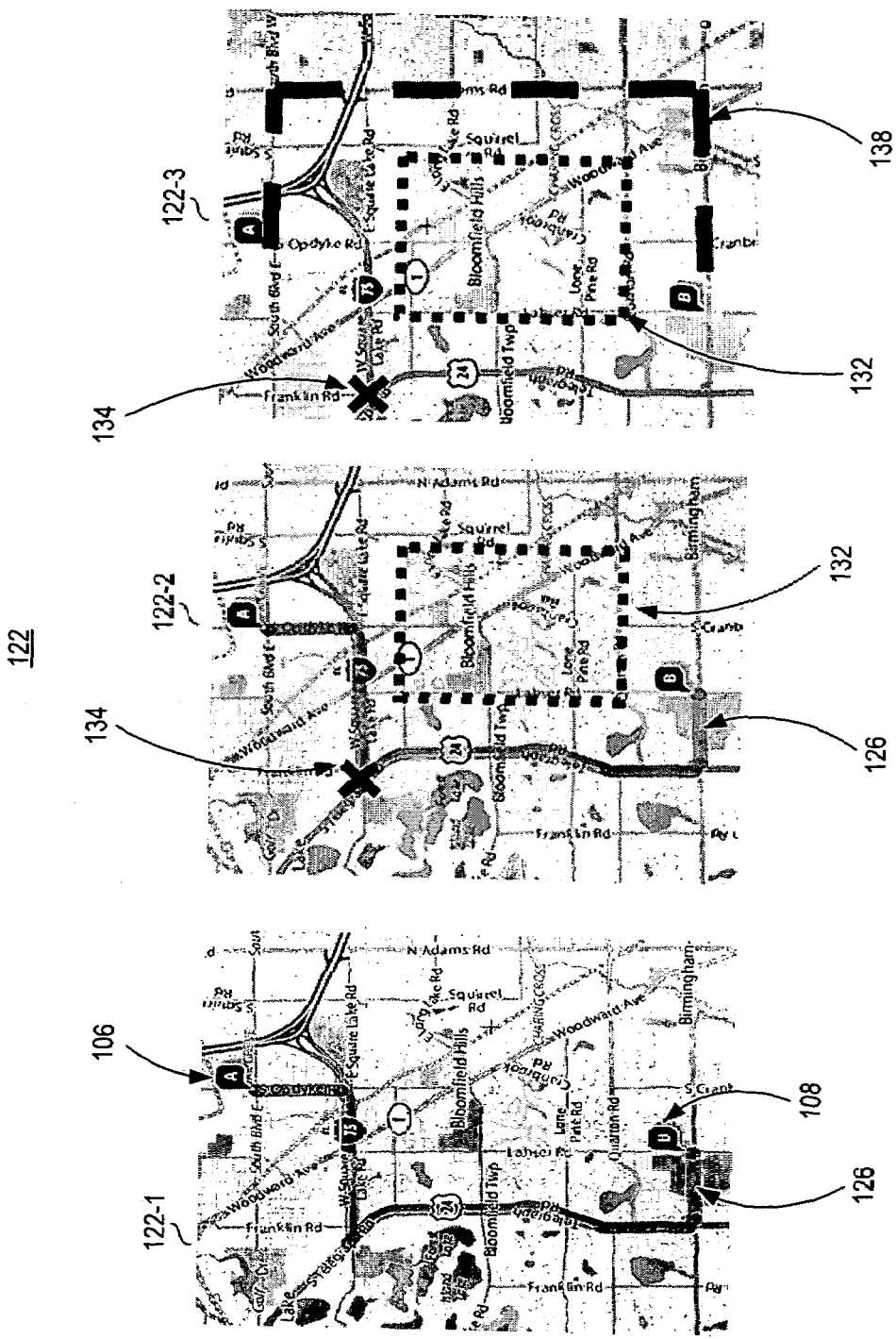
FIG. 3 illustrates a series of map views showing route representations of the various paths between a route source and a route destination point and a created route, free of excluded locations or areas.

FIG. 3 illustrates another representation, here shown generally at 122, shows the route source 106 and the exemplary route destination 108, here plotted on a series of map views. The first map view 122-1 shows a route 126 that traverses a highway. If, e.g., the user desires not to travel along a route that includes a highway, the route 126 is excluded from consideration. In the map view 122-2, the location 128 is undesired, and an area 132 is undesired. The potential route 134 is excluded from selection as the route 134 passes through the location 128. In the map view 122-3, a selected route 138 is shown. The route 138 does not pass through any of the undesired locations, areas, or utilize undesired road-types. As the route comports with the type of route that the user prefers, the user is more likely to accept and to follow the selected route.

Figure 4:
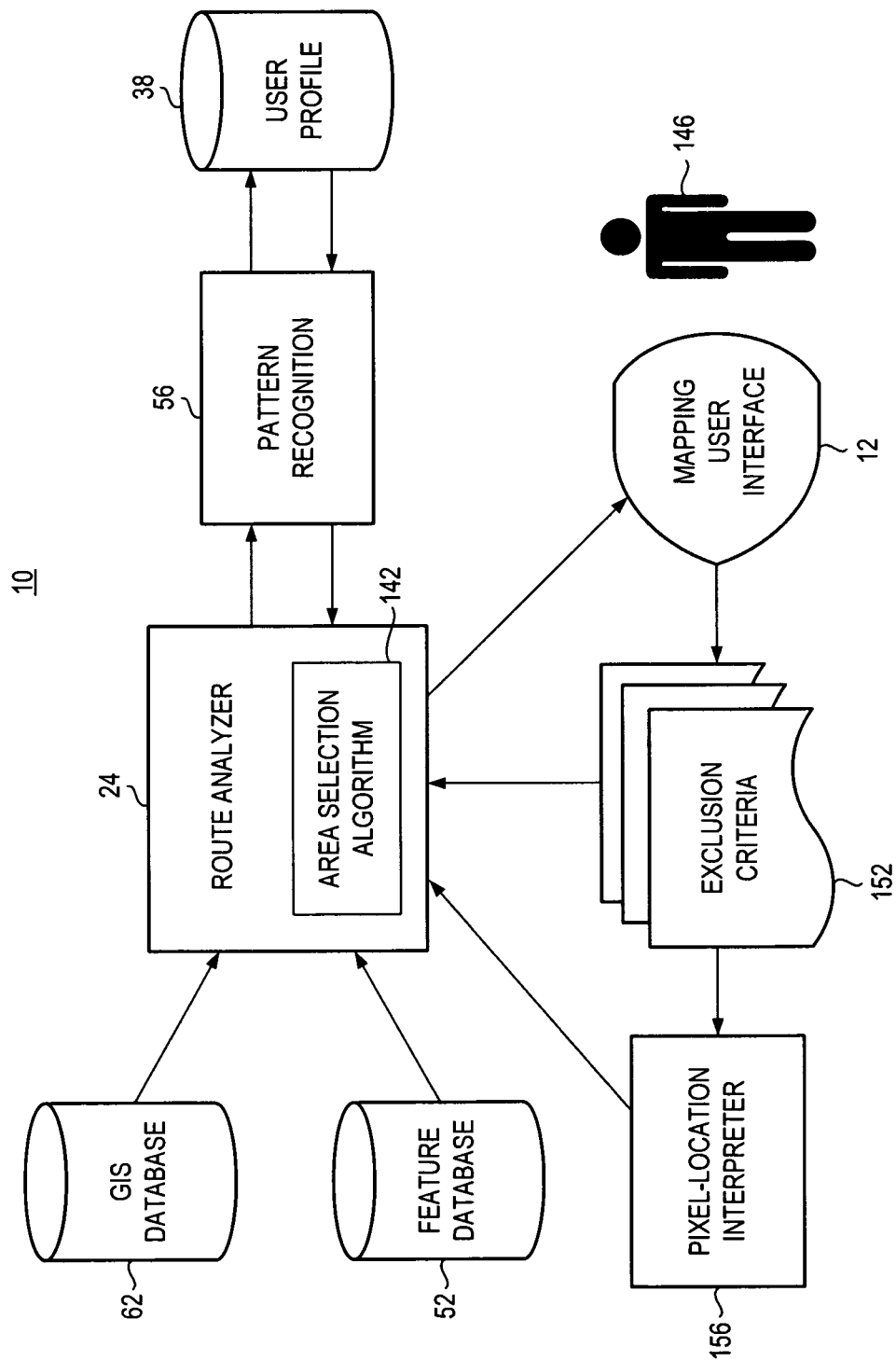
FIG. 4 illustrates a functional block diagram of an arrangement including an embodiment of the present invention.

FIG. 4 illustrates another representation of the electronic map device 10. In this representation, the various inputs that are provided to the device and to the route analyzer and mapper are represented. The route analyzer and mapper 124 is here further shown to include an area selection algorithm 142. The area section algorithm operates to calculate roads closest to a physical point identified by a user, here the user 146, and input by way of the user interface 12.

The user further inputs, using the user interface, exclusion information, here represented as exclusion criteria 152. If the exclusion criteria comprises category data, the exclusion criteria is provided directly to the route analyzer and mapper 24. Otherwise, if the exclusion criteria involves a user-specified point or area, the information is interpreted by a pixel-location interpreter 156, and interpreted information is then provided to the route analyzer and mapper.

The feature database 52 and the GIS database 62 are again shown. Feature information is provided by the feature database to the route analyzer and mapper. And, mapping information is provided by the GIS database to the route analyzer and mapper. The GIS information is any of various types of information including boundary defined, e.g., by mountains, waterfronts, etc.

The device 10 shown in FIG. 4 further includes the profile learner 56, here represented as a pattern recognition module. The pattern recognition module accesses data stored at the user profile database 38.

The route analyzer and mapper generates a map with a selected route thereon that is displayed at a device of the user interface 12.

In the exemplary implementation, the exclusion criteria information is processed by the route analyzer and mapper to treat the excluded location, area, or feature, to be lacking in passable roads. And, thereby, the associated route is excluded from selection.

In a further implementation, designated roads are given a weight of "badness" instead of being completely removed from consideration. In a scenario in which no possible route is completely free of exclusions, a route that is considered to be "least bad" is selected as the route for display.

Figure 5:
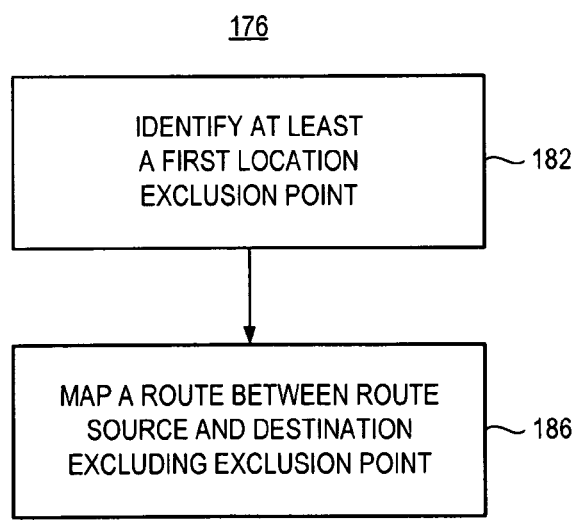
FIG. 5 illustrates a method flow diagram showing the method of operation of an embodiment of the present invention.

FIG. 5 illustrates a method flow diagram, shown generally at 176 representative of the method of operation of an embodiment of the present invention. The method 176 facilitates route planning of a route between a route source and a route destination.

First, and as indicated by the block 182, at least a first location exclusion point is identified. Then, and as indicated by the block 186, a route is mapped between the route source and the route destination in which the route at least selectably excludes at least the first location exclusion point.

Because a route is selected that takes into account locations, areas, or features considered to be undesirable by a user, the resultant, selected route is more likely to be accepted by a user.

Previously preferred embodiments of the invention and many of its improvements and advantages have been described with a degree of particularity. The description is of preferred examples of implementing the invention and the description of preferred examples is not necessarily intended to limit the scope of the invention. The scope of the invention is defined by the following claims:

What is claimed is:

1. An apparatus for facilitating route planning between a route source and a route destination, said apparatus comprising:
    a user input device for accepting user input identifying at least one excluded entity, each excluded entity being associated with at least one geographic location;
    a location point exclusion identifier configured to identify geographic locations associated with an excluded entity; and
    a route mapper configured to map a route between the route source and the route destination, wherein the route is a selected route that is selected from among available routes between the route source and route destination by avoiding selection of a route along which a user would encounter a geographic location associated with an excluded entity.

2. The apparatus of claim 1 further comprising a pattern identifier configured to identify user exclusion patterns based upon user-entered exclusion information.

3. The apparatus of claim 2 wherein said route mapper is further configured to map the selected route utilizing a pattern identified by said pattern identifier,
    wherein said route mapper identifies additional geographic locations based on the identified user exclusion patterns, said route mapper then selects the selected route to avoid said additional geographic locations that were identified based on the identified user exclusion patterns.

4. The apparatus of claim 3 wherein the exclusion information further identifies time-of-day information and wherein said route mapper is further configured to utilize the time-of-day information to map the route.

5. The apparatus of claim 1 further comprising a route visualizer configured to provide a visualization of the route mapped by said route mapper.

6. The apparatus of claim 1 wherein the entity is associated with Geographical Information Service (GIS) exclusion information.

7. The apparatus of claim 1 wherein if, from among the available routes between the route source and route destination, there is no route that avoids geographic locations associated with said entity, said router mapper selects that route that includes a least number of encounters with geographic locations associated with said entity.

8. The apparatus of claim 1 further comprising a position detector configured to identify a current location of said apparatus and add that current location to a list of geographic locations to be avoided based on corresponding input from said user-input device.

9. The apparatus of claim 1, wherein said entity is a business and said user input device accepts user input identifying said business.

10. An apparatus for facilitating route planning between a route source and a route destination, said apparatus comprising:
    a user input device for accepting user input identifying at least one geographic location that is to be excluded from route planning;
    a route mapper configured to map a route between the route source and the route destination, wherein the route is a selected route that is selected from among available routes between the route source and route destination by avoiding selection of a route passing said at least one geographic location to be excluded from route planning; and
    a position detector configured to identify a current location of said apparatus,
    wherein said current location is added to a list of geographic locations to be excluded from route planning, said current location being added to said list based on corresponding input from said user-input device while the apparatus is at that location.

11. The apparatus of claim 10 wherein if, from among the available routes between the route source and route destination, there is no route that avoids all the geographic locations to be excluded from route planning, said router mapper selects that route that includes a least number of encounters with the geographic locations to be excluded from route planning.

12. The apparatus of claim 10 further comprising a pattern identifier configured to identify user exclusion patterns based upon user-entered exclusion information;
    wherein said route mapper identifies additional geographic locations to be excluded from route planning based on the identified user exclusion patterns.

13. A method for facilitating route planning of a route between a route source and a route destination with a processor device, said method comprising:
- with said processor device, receiving user input, through an input actuator device in communication with said processor device, said user input identifying at least a first location exclusion point that is to be avoided when selecting a route between the route source and destination;
- with said processor device, identifying an exclusion pattern based on said user input;
- with said processor device, identifying additional location exclusion points not specified by user input but based on said exclusion pattern; and
- with said processor device, mapping the route between the route source and the route destination by avoiding any potential route that includes either a location exclusion point specified by user input or any of the additional location exclusion points identified based on the exclusion pattern.

14. The method of claim 13 further comprising generating a visualization of the route generated during said mapping.

15. The method of claim 13 further comprising:
receiving user input identifying an excluded entity; and
identifying location exclusion points that are geographic locations associated with that excluded entity.

16. The method of claim 13 further comprising:
identifying a current location of a user; and
upon receiving corresponding user input, including that current location as a location exclusion point specified by user input.

17. The method of claim 13 further comprising, if no potential route exists between the route source and route destination that avoids all location exclusion points, mapping a selected route between the route source and the route destination using a potential route that encounters a fewest number of location exclusion points.

18. The method of claim 13, further comprising:
weighting roads as to which should be most avoided; and
mapping the route based on said weighting of roads as to which should be most avoided.

* * * * *